(12) United States Patent
Nakamura

(10) Patent No.: US 7,986,537 B2
(45) Date of Patent: Jul. 26, 2011

(54) OVERCURRENT-PROTECTED SWITCHING-MODE POWER SUPPLY

(75) Inventor: Masaru Nakamura, Niiza (JP)

(73) Assignee: Sanken Electric Co., Ltd. (JP)

( * ) Notice: Subject to any disclaimer, the term of this patent is extended or adjusted under 35 U.S.C. 154(b) by 474 days.

(21) Appl. No.: 12/252,859

(22) Filed: Oct. 16, 2008

(65) Prior Publication Data
US 2009/0103335 A1 Apr. 23, 2009

(30) Foreign Application Priority Data
Oct. 22, 2007 (JP) ................. 2007-274280

(51) Int. Cl.
*H02H 7/122* (2006.01)
*G05F 1/40* (2006.01)
(52) U.S. Cl. ............. 363/56.1; 323/285; 361/18
(58) Field of Classification Search ............ 363/56.01, 363/56.09–56.12; 323/282–290, 908; 361/18, 361/79, 93.1, 93.9
See application file for complete search history.

(56) References Cited

U.S. PATENT DOCUMENTS

| 5,596,465 | A  | * | 1/1997  | Honda et al. ............. 361/18 |
| 7,339,804 | B2 | * | 3/2008  | Uchida ................. 363/56.1 |
| 7,577,003 | B2 | * | 8/2009  | Nakamura ............. 363/21.12 |
| 2004/0169977 | A1 | * | 9/2004  | Kotula ................. 361/93.1 |
| 2007/0291516 | A1 | * | 12/2007 | Nakamura et al. ..... 363/21.01 |

FOREIGN PATENT DOCUMENTS

| JP | 2004-40856  | A | 2/2004 |
| JP | 2005-184882 | A | 7/2005 |

* cited by examiner

*Primary Examiner* — Jessica Han
(74) *Attorney, Agent, or Firm* — Woodcock Washburn LLP

(57) ABSTRACT

A DC-to-DC converter having an active switch connected between a pair of DC input terminals via the primary winding of a transformer whose secondary winding is connected to a pair of DC output terminals via a rectifying and smoothing circuit. Operating under the control of an output voltage detector circuit, a switch control signal generator rapidly turns the active switch on and off so as to keep the DC output voltage constant. For overcurrent protection, a current detect resistor is connected in series with the active switch for providing an uncorrected current detect signal indicative of the current flowing through the active switch. An overcurrent protector generates, in response to a clocked ramp voltage, a correction voltage which builds up with time during each conducting period of the active switch. The correction voltage is subtracted from the uncorrected current detect signal to provide a corrected current detect signal. The switch control signal generator is caused to turn off the active switch when the corrected current detect signal rises to an overcurrent threshold.

14 Claims, 11 Drawing Sheets

OVERCURRENT-PROTECTED SWITCHING-MODE POWER SUPPLY

CROSS REFERENCE TO RELATED APPLICATIONS

This application claims priority to Japanese Patent Application No. 2007-274280, filed Oct. 22, 2007.

BACKGROUND OF THE INVENTION

This invention relates to an electronic power supply unit known as the switching-mode power supply (SMPS) such as a DC-to-DC converter having a feedback loop for holding the output voltage constant. More specifically, the invention pertains to such a power supply featuring provisions for overcurrent protection.

A typical conventional flyback SMPS (shown in FIGS. 1 and 2 of the drawings attached hereto) includes a transformer having a primary winding coupled to the pair of DC input terminals via an active switch, and a secondary winding coupled to the pair of DC output terminals via a rectifying diode and smoothing capacitor. The DC input voltage is turned on and off as the active switch is driven by pulses that have been width-modulated by a feedback circuit monitoring the DC output voltage. The feedback circuit includes a switch controller for on/off control of the active switch according to an output voltage detect signal indicative of the output voltage being fed to the load.

Also input to the switch controller is a corrected current detect signal, a corrected or modified version of a current detect signal. The current detect signal itself is a voltage signal obtained by connecting a resistor in series with the active switch. Indicative of the magnitude of the current flowing through the active switch, the current detect signal needs correction preparatory to application to the switch controller in order to hold the maximum output current of the SMPS within acceptable limits in the face of possible fluctuations in the input voltage. Such correction was hitherto implemented with two additional resistors and a capacitor.

A problem has existed in conjunction with these conventional means for correction of the current detect signal because the switch controller together with an associated power supply is usually supplied in the form of an integrated circuit known as a controller IC. Being external to this controller IC, the correcting resistors and capacitor added substantively to the manufacturing cost and size of the SMPS. Additionally, connected between the pair of DC input terminals, one of the correcting resistors caused a power loss that became particularly serious when the input voltage was high.

Japanese Unexamined Patent Publication No. 2005-184882 proposes a different method of making the maximum output current of an SMPS within limits irrespective of changes in the input voltage. It teaches to use both a ramp generator and a rectangular wave generator and to superpose the ramp voltage on the rectangular wave voltage. The ramp voltage and the rectangular wave voltage are both synchronized with the conducting periods of the active switch, and the rectangular wave voltage has an amplitude varying in inverse proportion with the input voltage.

Although capable of lessening variations in the maximum output voltage in response to fluctuations in the input voltage, this second prior art device has its own shortcomings. Besides being a considerable addition to the size of the power supply, the rectangular wave generator is itself configured to detect the input voltage for amplitude-modifying its rectangular wave output accordingly. The result is a power loss in proportion with the square of the input voltage to the serious impairment of the SMPS efficiency.

Another problem heretofore experienced in connection with the SMPS is subharmonic oscillation. Minute variations in the current detect signal due to external disturbances could lead to such changes in the width of the successive control pulses applied to the active switch as might result in oscillation or unstable operation. Subharmonic oscillations were particularly easy to occur when the duty ratio of the width-modulated switch control pulses exceeded fifty percent. Conventionally, this inconvenience has been coped with by superposing a ramp voltage on the current detect signal into what is termed the "slope-corrected current detect signal," as disclosed in Japanese Unexamined Patents Publication Nos. 2005-184882, supra, and 2004-40856.

SUMMARY OF THE INVENTION

The present invention has it as an object, in an SMPS of the kind defined, to minimize the variations of the maximum output current in the face of fluctuations in input voltage without lessening the efficiency of the device or adding to its size.

Another object of the invention is to realize the first recited object and, at the same time, save the SMPS of the kind defined from subharmonic oscillation.

Stated in brief, the invention concerns an overcurrent-protected, switching-mode power supply for DC-to-DC conversion. It comprises inductance means (e.g., transformer) connected to the DC input means. An active switch is connected to the DC input means via the inductance means for switching the DC input voltage on and off. Connected between an output voltage detector circuit and a control input of the active switch, a switch control signal generator turns the active switch on and off to keep the DC output voltage constant. A current detect means such as a resistor provides an uncorrected current detect signal indicative of a current flowing through the active switch. A current detect signal correction network is connected to the switch control signal generator and the current detect means for providing a corrected current detect signal by generating a correction signal which rises with time during each conducting period of the active switch and by subtracting the correction signal from the uncorrected current detect signal. A comparator has a first input connected to the current detect signal correction means, a second input connected to an overcurrent threshold source, and an output connected to the switch control signal generator, for causing the switch control signal generator to turn off the active switch when the corrected current detect signal rises to the overcurrent threshold.

Such being the improved construction of the overcurrent-protected SMPS according to the invention, all the means required for correction of the current detect signal can be integrated into the familiar controller IC. The SMPS according to the invention is therefore significantly less in both space requirement and manufacturing cost than its conventional counterparts.

An additional benefit of the invention is that it requires no dedicated means for detection of the input voltage in order to reduce the variations of the maximum output current due to fluctuations in the input voltage. The invention is therefore free from the problems of power loss, cost increase, and large space requirement that have been conventionally encountered with the input voltage detector circuit.

In another preferred embodiment of the invention disclosed herein, the current detect signal correction network is modified to include means for generating an alternative correction signal which goes up with time during a first predefined segment of each conducting period of the active switch and which goes down with time during a second predefined segment of each conducting period of the active switch. This alternative correction signal is here again subtracted from the uncorrected current detect signal to provide an alternative corrected current detect signal. The alternative corrected current detect signal is also utilized for causing the switch control signal generator to turn off the active switch when the alternative correct current detect signal rises to the overcurrent threshold.

With the alternative correction signal subtracted as above from the uncorrected current detect signal, the resulting alternative corrected current detect signal slopes relatively gently during the first segment of each conducting period of the active switch and more steeply during the second segment thereof. These steeply sloping segments of the alternative corrected current detect signal are effective for prevention of subharmonic oscillation. Thus the alternative corrected current detect signal serves the dual purpose of overcurrent protection and subharmonic oscillation prevention.

The above and other objects, features and advantages of this invention will become more apparent, and the invention itself will best be understood, from a study of the following description and appended claims, with reference had to the attached drawings showing some preferable embodiments of the invention.

DETAILED DESCRIPTION

Figure 1:
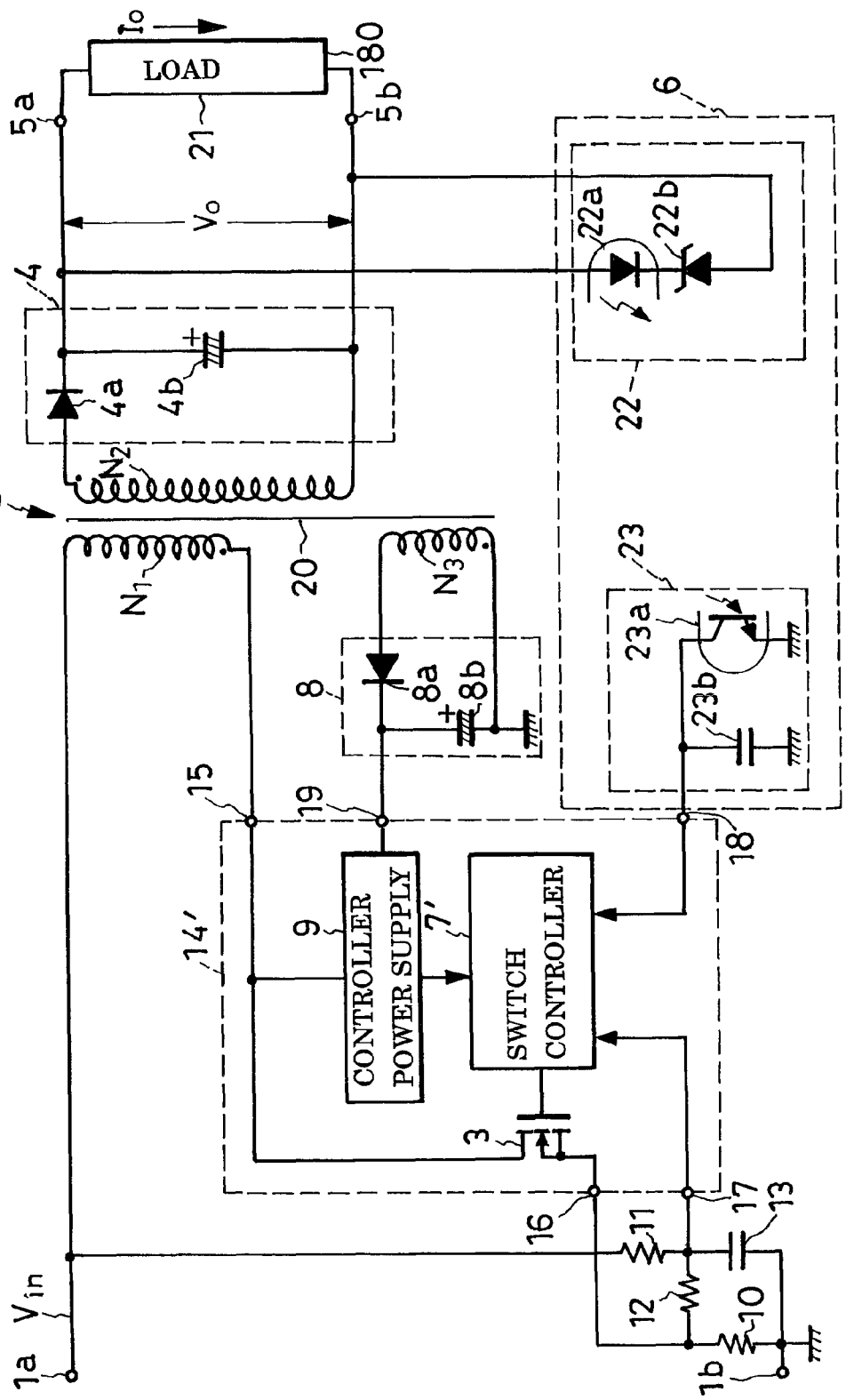
FIG. 1 is a schematic electrical diagram, partly in block form, of the prior art overcurrent-protected SMPS bearing particular pertinence to the instant invention.
Figure 2:
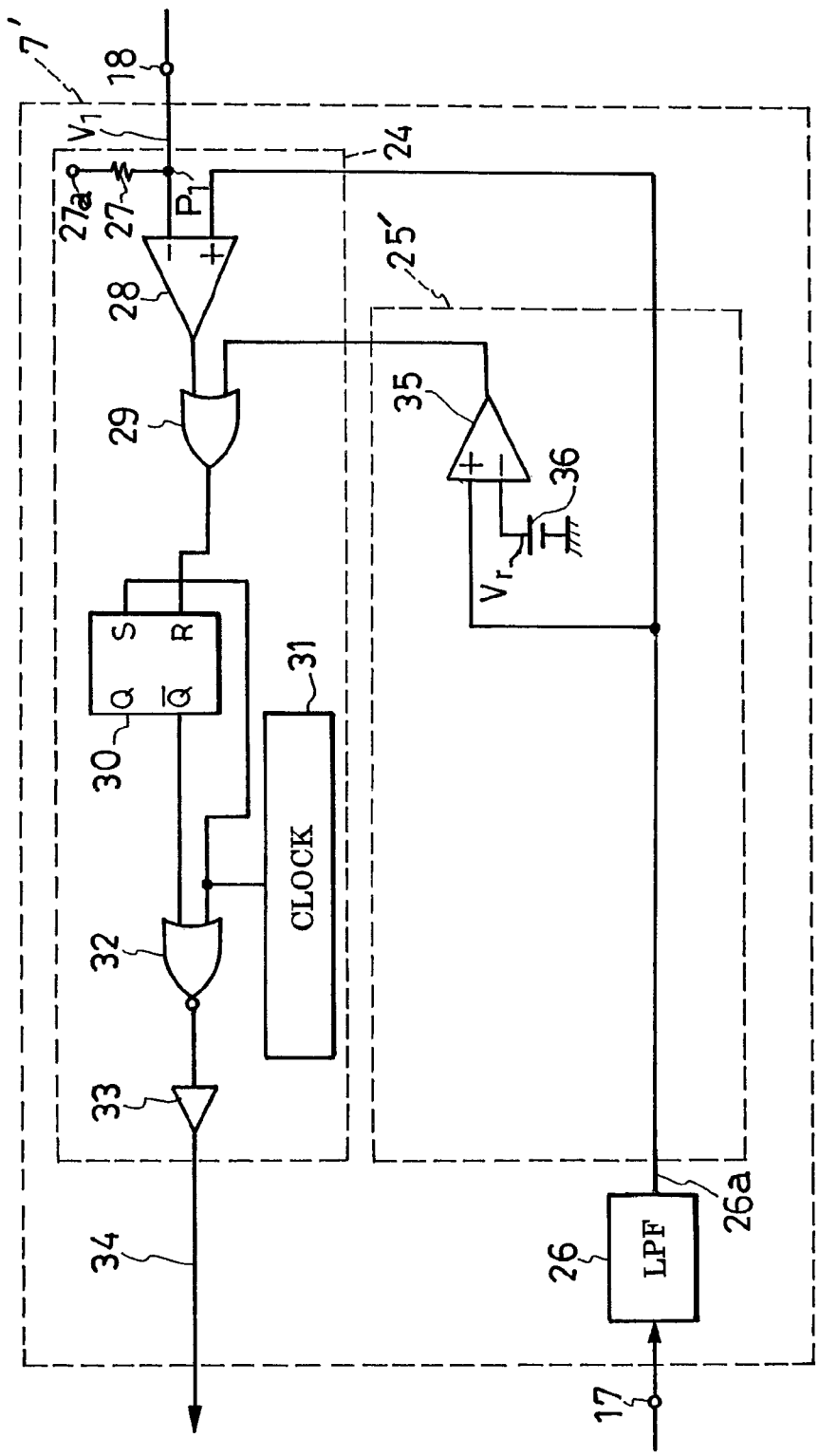
FIG. 2 is a schematic electrical diagram showing in detail the switch controller included in the controller IC of the prior art device of FIG. 1.

The present invention has particular pertinence to the prior art flyback SMPS diagramed in FIGS. 1 and 2 of the drawings above. A closer inspection of this prior art device will redound to the better understanding of the problems solved by this invention and of how the invention differs from the prior art. A full description of the prior art device will also greatly simplify the description of the embodiments of the invention.

With reference to FIG. 1 in particular, the illustrated prior art flyback SMPS broadly comprises:

1. A pair of DC input terminals $1_a$ and $1_b$ as the DC input means to be connected to a DC source, not shown, such as a rectifying and smoothing circuit or battery.

2. A transformer 2 as the inductance means having its primary side connected to the DC input terminals $1_a$ and $1_b$.

3. An active switch 3 shown as an n-channel metal-oxide-semi-conductor field-effect transistor (nMOSFET or IGFET) for switching the DC input on and off.

4. An output rectifying and smoothing circuit 4 connected to the secondary side of the transformer 2.

5. A pair of DC output terminals $5_a$ and $5_b$ as the output means connected to the rectifying and smoothing circuit 4 and shown connected to a load 21 to be powered.

6. An output voltage detector circuit 6 connected to the pair of DC output terminals $5_a$ and $5_b$ for detecting the output voltage $V_o$ being applied to the load 21, for feedback control of that output voltage.

7. A switch controller 7' connected between the output voltage detector circuit 6 and the control input of the active switch 3 for controllably driving the latter so as to keep constant the output voltage $V_o$ being applied to the load 21.

8. A controller power supply 9, complete with a rectifying and smoothing circuit 8, connected to the primary side of the transformer 2 for feeding the switch controller 7'.

9. A current detect resistor 10 as the current detect means connected between the active switch 3 and the DC input terminal $1_b$, which is grounded, for providing a current detect signal indicative of the magnitude of the input current flowing through the active switch.

10. Two correcting resistors 11 and 12 and a correcting capacitor 13 for correcting the current detect signal preparatory to application to the switch controller 7'.

Of the above listed components, the active switch 3, switch controller 7' and controller power supply 9 are customarily supplied in combination in the form of an integrated circuit, as shown bounded by the dashed outline and labeled 14'. This integrated circuit 14' will be hereinafter referred to as the controller IC. The controller IC 14' has five terminals 15-19 for connection to the required parts of the SMPS.

The transformer 2 has a magnetic core 20 around which there are coiled a primary winding $N_1$, secondary winding $N_2$, and tertiary winding $N_3$. The transformer windings $N_1$, $N_2$ and $N_3$ are polarized as indicated by the dots in FIG. 1. Energy is therefore stored in the transformer 2 during the conducting periods of the active switch 3 and released during the ensuing nonconducting periods of the active switch.

The nMOSFET active switch 3 has a drain connected to the first DC supply terminal $1_a$ via the transformer primary $N_1$, a source connected to the grounded second DC supply terminal $1_b$ via the current detect resistor 10, and a gate or control input connected to the switch controller 7'.

The output rectifying and smoothing circuit 4 comprises a rectifying diode $4_a$ and smoothing capacitor $4_b$. The smoothing capacitor $4_b$ is connected in parallel with the transformer secondary $N_2$ via the rectifying diode $4_a$. The rectifying diode $4_a$ is oriented for conduction during the nonconducting periods of the active switch 3. The smoothing capacitor $4_b$ has its pair of opposite terminals connected respectively to the pair of DC output terminals $5_a$ and $5_b$ which in turn are shown connected to the load 21.

Connected between the transformer tertiary $N_3$ and the controller power supply 9, the rectifying and smoothing circuit 8 also comprises a rectifying diode $8_a$ and smoothing capacitor $8_b$. Thus the rectifying and smoothing circuit 8 feeds the switch controller 7' with a DC voltage via the controller power supply 9 after the active switch 3 has been set into rapid on/off operation.

Besides being connected with the internal rectifying and smoothing circuit 8 via the terminal 19 of the controller IC 14', the controller power supply 9 is connected both to the first DC supply terminal $1_a$ via the terminal 15 of the controller IC 14' and the transformer primary $N_1$ and to the supply terminal of the switch controller 7'. The controller power supply 9 is customarily furnished with a startup circuit for temporarily energizing the switch controller 7' with a voltage from the first supply terminal $1_a$ before a voltage develops across the transformer tertiary $N_3$. The rectifying and smoothing circuit 8 feeds the switch controller 7' thereafter.

Forming a part of the feedback loop for control of the output voltage, the output voltage detector circuit 6 has a secondary section 22 and primary section 23 optically coupled together and thus electrically isolated from each other. The secondary section 22 is a serial circuit of a light-emitting diode (LED) $22_a$ and voltage-regulating zener diode $22_b$ connected between the pair of output terminals $5_a$ and $5_b$. Excited with the difference between the output voltage $V_o$ and the reference voltage offered by the voltage-regulating zener diode $22_b$, the LED $22_a$ provides an optical output in proportion with the output voltage $V_o$.

The primary section 23 of the output voltage detector circuit 6 comprises a phototransistor $22_a$ and capacitor $23_b$ which are both grounded on one hand and electrically interconnected on the other. Irradiated by the optical output from the LED $22_a$ of the output voltage detector circuit secondary section 22, the phototransistor $22_a$ provides an impedance in inverse proportion with the input light intensity and therefore with the output voltage $V_o$.

Reference may be had to FIG. 2 for a detailed study of the switch controller 7' as heretofore constructed. The switch controller 7' is functionally divisible into a pulse-width-modulated switch control signal generator 24, overcurrent protector 25', and low-pass filter (LPF) 26. The switch control signal generator 24 is shown to include a resistor 27 which, however, might be considered a part of the output voltage detector circuit 6. The resistor 27 is connected between an internal DC supply terminal $27_a$ and, via the terminal 18 of the controller IC 14', the collector of the phototransistor $23_a$, FIG. 1, of the output voltage detector circuit 6. The voltage from the terminal $27_a$ is therefore divided by the resistor 27 and phototransistor $23_a$. The voltage $V_1$ between the ground and the junction $P_1$ between phototransistor $23_a$ and resistor 27 is equivalent to that across the phototransistor, varying in inverse proportion with the output voltage $V_o$.

The junction $P_1$ between phototransistor $23_a$ and resistor 27 is connected to the minus input of a feedback comparator 28, the plus input of which is connected to the LPF 26 by way of a conductor $26_a$. The LPF 26, intended for attenuation of high frequency noise, is connected to the current detect resistor 10, FIG. 1, via the terminal 17 of the controller IC 14' and the resistor 12. There is thus directed to the plus input of the feedback comparator 28 the corrected current detect signal, that is, the modification by the correcting resistor 12 of the uncorrected current detect signal obtained by the current detect resistor 10. Comparing this corrected current detect signal and the voltage $V_1$ across the phototransistor $23_a$, the feedback comparator 28 puts out trigger pulses indicative of the moments for terminating conduction through the active switch 3. More will be said presently about both uncorrected current detect signal and corrected current detect signal.

Each time the amplitude of the corrected current detect signal reaches the voltage $V_1$, the feedback comparator 28 goes high, and so does an OR gate 29 connected to the output of the feedback comparator. The OR gate 29 has its output connected to the reset input R of an RS flip-flop 30, which is therefore reset when the OR gate goes high.

Connected to the set input S of the flip-flop 30 is a clock 31 which generates clock pulses at a rate in the range of 20-100 kHz, with a pulse duration less than the minimum conducting period of the active switch 3. The flop-flop 30 is set by each clock pulse, with the result that its inverting output $Q^-$ goes low.

A NOR gate 32 has an input connected to the inverting output $Q^-$ of the flip-flop 30, and another to the clock 31. The output from the NOR gate 32 is therefore high when the flip-flop 30 is set and, at the same time, no clock pulses are being input. Thus the NOR gate 32 provides a pulse-width-modulated gate control signal for driving the active switch 3, FIG. 1. The gate control signal is applied via a driver circuit 33 and conductor 34 to the gate of the nMOSFET active switch 3. The active switch 3 conducts when the gate control signal from the NOR gate 32 is high.

Reference may be had back to FIG. 1 for a closer investigation of the aforesaid uncorrected current detect signal and corrected current detect signal. Since the current detect resistor 10 is connected in series with the active switch 3, a voltage develops across this resistor in proportion with the magnitude of the current flowing through the active switch. This voltage provides the current detect signal, which, however, needs amendment, being unfit for direct application to the switch controller 7' for the following reasons:

In order to limit the maximum value of the output current $I_o$ in response to fluctuations in the input voltage $V_{in}$, the correcting capacitor 13 is connected between the pair of DC supply terminals $1_a$ and $1_b$ via the first correcting resistor 11. The current detect resistor 10 is connected in parallel with the correcting capacitor 13 via the second correcting resistor 12. There is thus input to the controller IC terminal 17 a voltage signal that grows higher than the voltage across the current detect resistor 10 with an increase in the input voltage $V_{in}$. This voltage signal is what is herein termed the corrected current detect signal, a revised version of the uncorrected current detect signal across the current detect resistor 10.

Since the transformer primary $N_1$ has inductance, the current flowing through the active switch 3 during each conducting period of the active switch 3 increases in magnitude with a gradient. Consequently, the corrected current detect signal also rises with a gradient during each conducting period of the active switch 3.

Let us assume that the two correcting resistors 11 and 12 and correcting capacitor 13 were not provided. Then, under the influence of signal delays introduced by the switch control signal generator 24, FIG. 2, and overcurrent protector 25' of the switch controller 7', the maximum value of the output current $I_o$ fed to the load 21 would grow inordinately high with a rise in the input voltage $V_{in}$, as indicated by the solid line in the graph of FIG. 3. Ideally, in switching-mode power supplies in general, the maximum output current should be constant irrespective of variations in the input voltage $V_{in}$, as represented by the dashed line in FIG. 3. The corrected current detect signal, obtained as above described with reference to FIG. 1, will closely approximate the ideal line of the graph.

Referring to FIG. 2 again, the overcurrent protector 25' of the switch controller 7' includes an overcurrent detector shown as a comparator 35. The overcurrent detect comparator 35 has a plus input connected to the LPF 26, a minus input connected to a source 36 of a reference voltage representative of an overcurrent threshold $V_r$, and an output connected to the OR gate 29 of the switch control signal generator 24. The LPF 26 has its input connected as aforesaid to the controller IC terminal 17 for inputting the corrected current detect signal.

The overcurrent detect comparator 35 of the overcurrent protector 25' puts out a trigger signal when the corrected current detect signal crosses the overcurrent threshold $V_r$. The trigger signal is delivered via the OR gate 29 to the reset input R of the flip-flop 30 thereby resetting the same and so causing the active switch 3 to turn off. The overcurrent threshold $V_r$ may be so predetermined that the corrected current detect signal does not cross it when the load 21 is being fed normally, but does do so when the load is either short-circuited or low in impedance.

Figure 3:
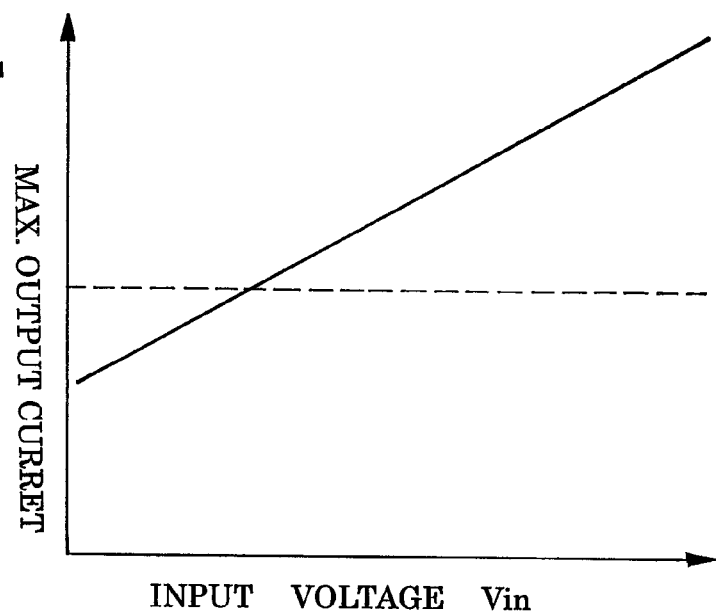
FIG. 3 is a graph plotting the curve of the maximum output current of the prior art SMPS against the input voltage as compared with the ideal one.

The maximum output current of the SMPS will be practically constant regardless of fluctuations in input voltage, as represented by the dashed line in the graph of FIG. 3, by modifying the current detect signal with the two correcting resistors 11 and 12 and capacitor 13 as in the prior art device of FIGS. 1 and 2. However, being external as above stated to the controller IC 14', these correcting resistors 11 and 12 and capacitor 13 added to the manufacturing cost of the SMPS through an increase in the number of component parts and to the size of the device.

An additional drawback of the conventional correction means is that the first correcting resistor 11 is connected between the pair of DC supply terminals $1_a$ and $1_b$, inviting a loss of power. The power loss became even more substantial when the input voltage $V_{in}$ was high. Thus the prior art SMPS suffered a drop in efficiency, particularly when operating with a high input voltage $V_{in}$ and under light load.

Embodiment of FIGS. 4-9

The present invention defeats all the noted drawbacks of the above and other comparable prior art devices. The invention is currently believed to be best embodied in the flyback SMPS shown in FIGS. 4-6, which is analogous in construction with the prior art device of FIGS. 1 and 2 except, of course, for the features of the invention to be pointed out specifically. Like reference characters are therefore used to denote like parts throughout FIGS. 1, 2 and 4-6.

Figure 4:
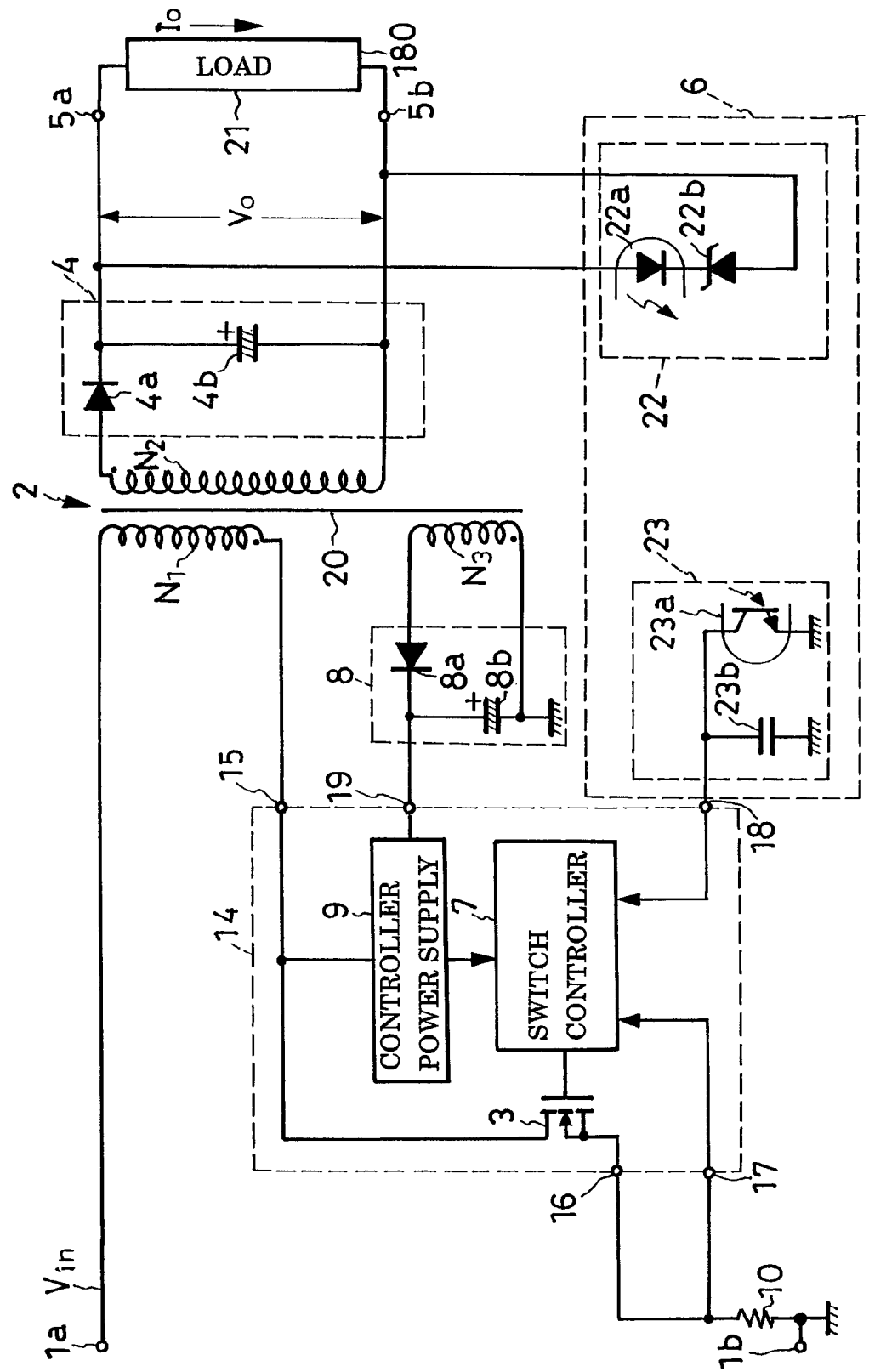
FIG. 4 is a schematic electrical diagram, partly in block form, of the overcurrent-protected SMPS built upon the novel concepts of this invention.

A comparison of FIGS. 1 and 4 will reveal that the SMPS according to the invention differs from the prior art, as far as these figures are concerned, only in the absence of the correcting resistors 11 and 12 and correcting capacitor 13. Except for these correcting resistors 11 and 12 and correcting capacitor 13, the foregoing description of FIG. 1 applies to FIG. 4, so that no repeated explanation of FIG. 4 is deemed necessary.

Figure 6:
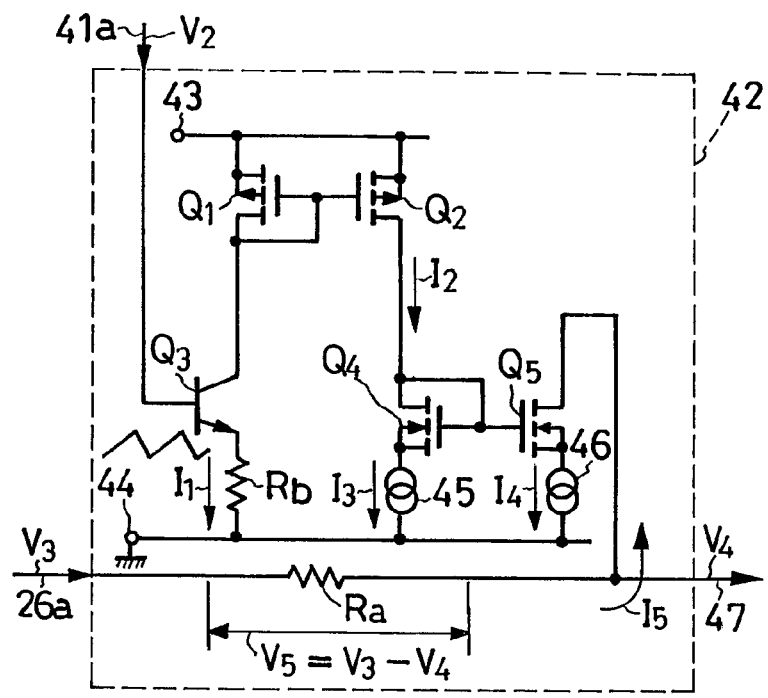
FIG. 6 is a schematic electrical diagram showing in detail the correcting circuit of the switch controller of FIG. 5.
Figure 5:
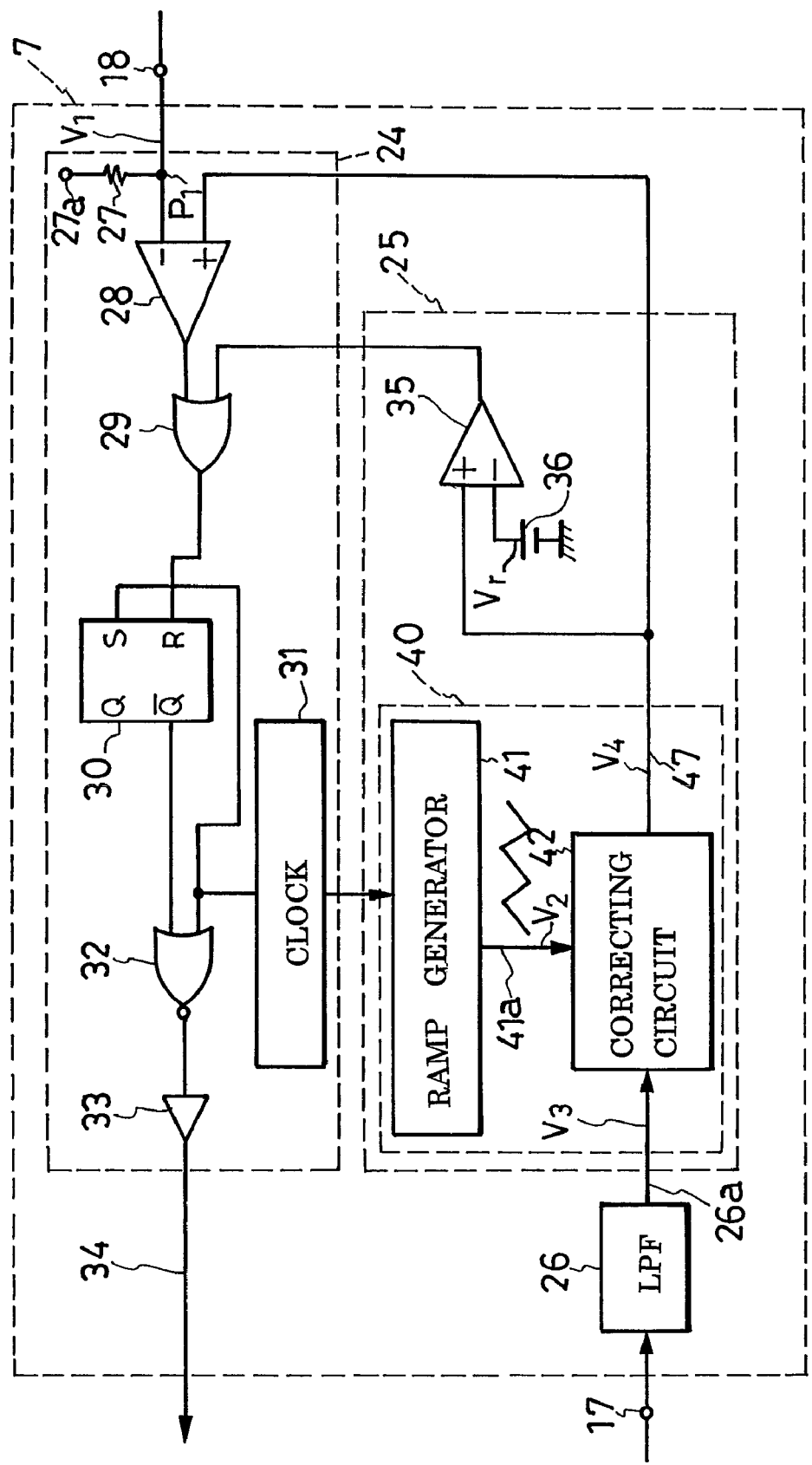
FIG. 5 is a schematic electrical diagram, partly in block form, showing in detail the switch controller included in the controller IC of the SMPS of FIG. 4.

More significantly, the invention differs from the prior art in the details of the switch controller 7 which are illustrated in FIGS. 5 and 6. Incorporating this modified switch controller 7 in place of the conventional switch controller 7', the controller IC of the SMPS according to the invention is generally labeled 14 in FIG. 4 in contradistinction from the prior art controller IC 14', FIG. 1. The modified switch controller 7 has inputs connected to the output voltage detector circuit 6, to the controller power supply 9, and directly to the current detect resistor 10, and an output connected to the gate of the nMOSFET active switch 3.

The controller IC 14 according to the invention features a current detect signal correction network 40, FIG. 5, which is integrally incorporated therein to supersede the conventional external correcting resistors 11 and 12, FIG. 1, and correcting capacitor 13. The current detect signal correction network 40 is shown as part of an overcurrent protector 25 of the switch controller 7. The switch control signal generator 24, another component of the switch controller 7, is of the same construction and functions as that designated by the same reference numeral in FIG. 2.

With continued reference to FIG. 5 the overcurrent protector 25 of the switch controller 7 comprises, in addition to the current detect signal correction network 40, an overcurrent detect comparator 35 and overcurrent threshold voltage source 36, as does the overcurrent protector 25', FIG. 2, of the prior art SMPS. The current detect signal correction network 40 comprises a ramp (triangular wave) generator 41 and correcting circuit 42 for mitigating the variations of the maximum output current of the SMPS due to fluctuations in the input voltage $V_{in}$. The correcting circuit 42 is shown in detail in FIG. 6, to which reference will be had presently.

Figure 7:
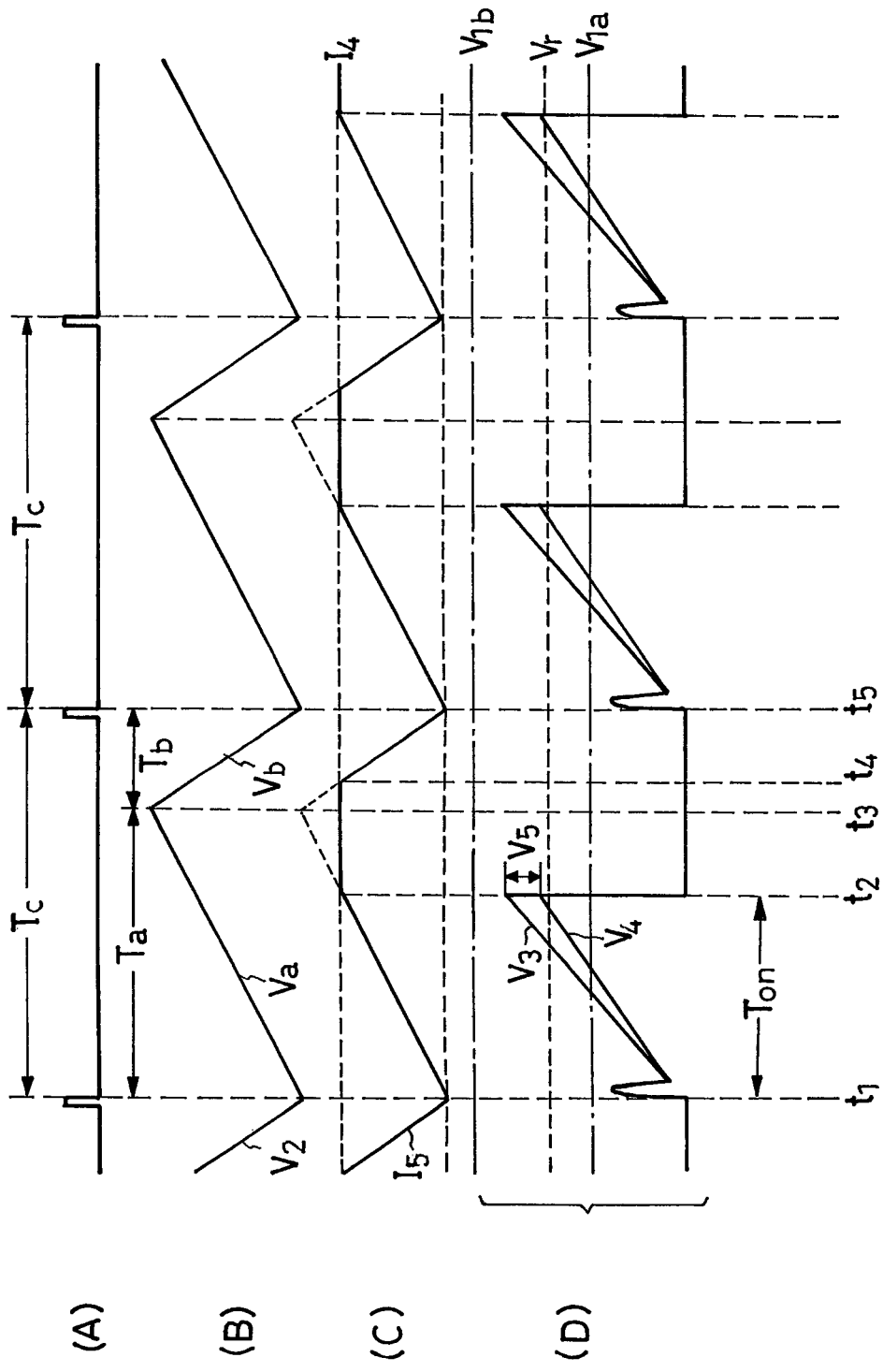
FIG. 7, consisting of (A) through (D), is a diagram of waveforms appearing at various parts of FIGS. 4-6 when the input voltage is relatively low.
Figure 8:
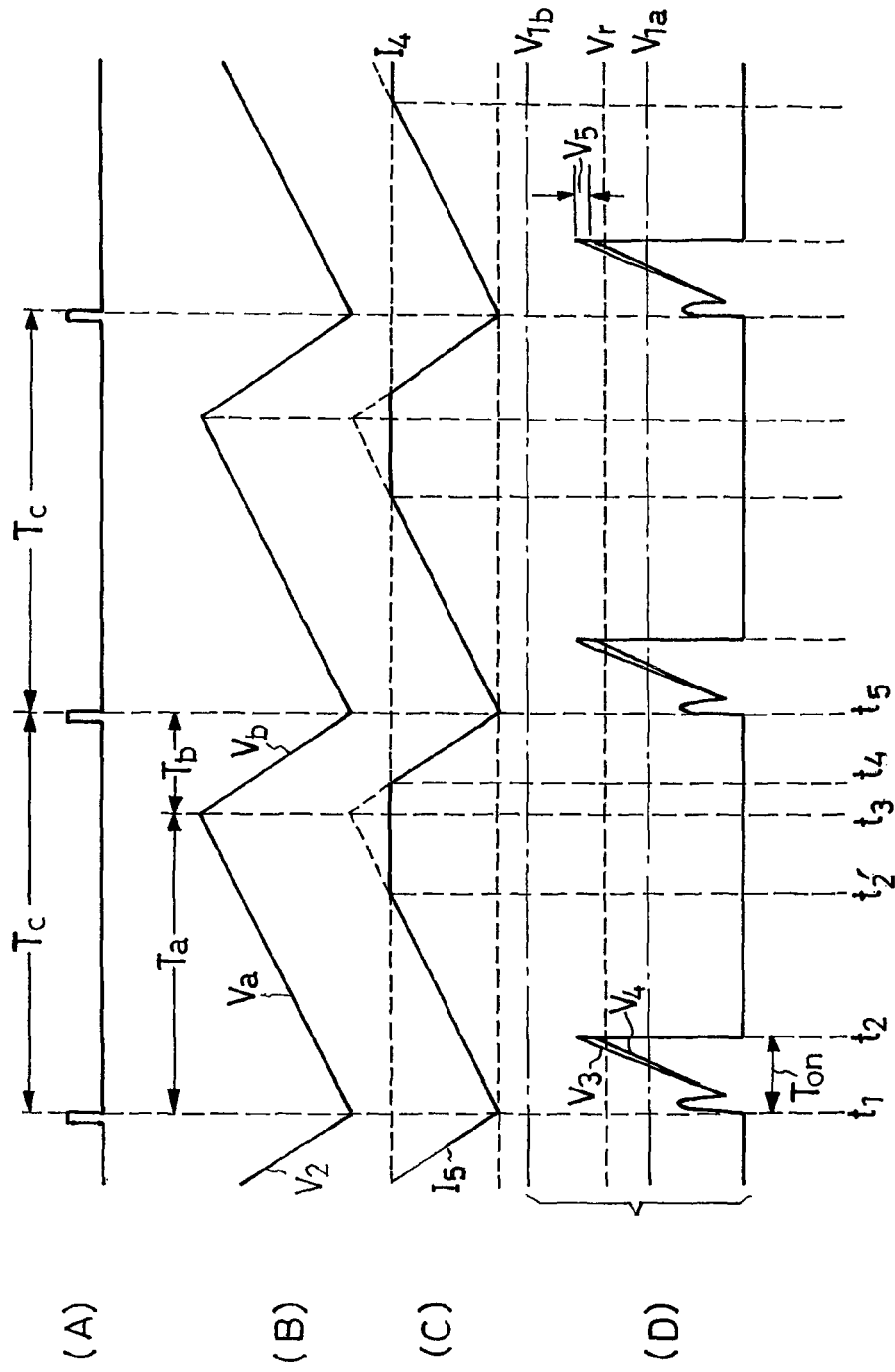
FIG. 8, consisting of (A) through (D), is a diagram of waveforms appearing at various parts of FIGS. 4-6 when the input voltage is higher.

The following description of FIGS. 4-6 will be better understood by referring also to the waveform diagrams of FIGS. 7 and 8. FIG. 7 depicts waveforms appearing at various parts of the SMPS when the input voltage $V_{in}$ is relatively low. FIG. 8 is a similar waveform diagram when the input voltage $V_{in}$ is higher.

Connected to the clock 31 of the switch control signal generator 24, the ramp generator 41 of the current detect signal correction network 40 puts out a periodic ramp voltage $V_2$ as at (B) in FIGS. 7 and 8 in synchronism with the incoming clock pulses seen at (A) in FIGS. 7 and 8. The clock pulses have a cycle $T_c$ longer than the maximum possible conducting period of the active switch 3 and are each less in duration than each conducting period of the active switch. The clock pulse determine the beginnings of the conducting periods of the active switch 3.

Triggered by these clock pulses, the ramp generator 41 produces the ramp voltage $V_2$ which cyclically repeats a positive-going segment $V_a$ and a negative-going segment $V_b$. The positive-going segment $V_a$ of the ramp voltage $V_2$ (i.e., each ramp of the ramp voltage) occurs in the first division $T_a$ of each cycle $T_c$ of the clock pulses, lasting from the beginning $t_1$ of each conducting period of the active switch 3 to the moment $t_3$ that comes after the maximum possible conducting period of the active switch. The negative-going segment $V_b$ of the ramp voltage $V_2$ occurs in the second division $T_b$ of the cycle $T_c$, lasting from moment $t_3$ to moment $t_5$, the latter being when one cycle of the ramp voltage comes to an end. Contrary to the showings of FIGS. 7 and 8, however, the beginning of each cycle of the ramp voltage $V_2$ need not be in exact agreement with that of the clock signal, all that is necessary being that the ramp voltage be in synchronism with the clock signal.

The ramp generator 41 delivers the ramp voltage $V_2$ to the correcting circuit 42, FIG. 5, to which is also input the low-pass-filtered, uncorrected current detect signal $V_3$, seen at (D) in FIGS. 7 and 8, from the LPF 26. The output from the correcting circuit 42 is the corrected current detect signal $V_4$, the remainder of subtraction of a correction voltage $V_5$ (to be defined later) from the uncorrected current detect signal $V_3$. The corrected current detect signal $V_4$ is delivered both to the feedback comparator 28 of the switch control signal generator 24 and to the overcurrent detect comparator 35 of the overcurrent protector 25.

With reference to FIG. 6 the correcting circuit 42 includes a voltage-converting resistor $R_a$ having one extremity connected to the output conductor $26_a$ of the LPF 26 and another to the output conductor 47 of the corrected current detect signal $V_4$; that is, the voltage-converting resistor $R_a$ is connected serially between the LPF 26, FIG. 5, and the overcurrent detect comparator 35 of the overcurrent protector 25. A change in the magnitude of the current $I_5$ flowing through the voltage-converting resistor $R_a$ results in a corresponding change in the voltage $V_5$ across the voltage-converting resistor $R_a$. The current $I_5$ that flows through the voltage-converting resistor $R_a$ rises in magnitude with the progress of each conducting period of the active switch 3 in the illustrated embodiment.

Thus, as will be noted from (D) in both FIGS. 7 and 8, the difference between the amplitudes of the uncorrected current detect signal $V_3$ and corrected current detect signal $V_4$ rises with time during each conducting period $T_{on}$ of the active switch 3. That difference between the signals $V_3$ and $V_4$ (i.e., voltage drop across the voltage-converting resistor $R_a$) is designated $V_5$ in FIGS. 7 and 8. Since the uncorrected current detect signal $V_3$, the corrected current detect signal $V_4$, and the voltage drop $V_5$ across the voltage-converting resistor $R_a$ are in the relation, $V_4=V_3-V_5$, this resistor $R_a$ serves as a subtractor in translating the uncorrected current detect signal $V_3$ into the corrected one $V_4$. The voltage drop $V_5$ across the resistor $R_a$ will be hereinafter referred to as the correction voltage or correction signal.

The correcting circuit 42 further comprises five control devices $Q_1$, $Q_2$, $Q_3$, $Q_4$ and $Q_5$. The first and second control devices $Q_1$ and $Q_2$ are shown as p-channel MOSFETs (pMOSFETs) or p-channel IGFETs. The third control device $Q_3$ is shown an npn transistor. The fourth and fifth control devices $Q_4$ and $Q_5$ are shown as n-channel MOSFETs (nMOSFETs) or n-channel IGFETs. The first control device $Q_1$ has its source or first main electrode connected to the DC supply terminal 43, its drain or second main electrode, and its gete or control electrode connected to the drain of the first control device $Q_1$. The second control device $Q_2$ has its source or first main electrode connected to the DC supply terminal, its drain or second main electrode, and its gete or control electrode connected to the drain and gete of the first control device $Q_1$. The third control device $Q_3$ has its emitter or first main electrode connected to the ground terminal 44 via a current-converting resistor $R_b$, its collector or second main electrode connected to the drain of the first control device $Q_1$, and its base or control electrode connected to the output conductor $41_a$ of the ramp generator 41, FIG. 5, of the current detect signal correction network 40 as the current detect signal correction means. The fourth control device $Q_4$ has its source or first main electrode connected to the ground terminal 44 via a first constant current circuit 45, its drain or second main electrode connected to the drain of the second control device $Q_2$, and its gete or control electrode connected to the drain of the fourth control device $Q_4$. The fifth control device $Q_5$ has its source or first main electrode connected to the ground terminal 44 via a second constant current circuit 46, its drain or second main electrode connected to a voltage-converting resistor $R_a$ for inputting the correction current $I_5$ that has flown therethrough, and its gete or control electrode connected to the gete and drain of the fourth control device $Q_4$. The first and second control devices $Q_1$ and $Q_2$ constitute a first current mirror. The fourth and fifth control devices $Q_4$ and $Q_5$ constitute a second current mirror.

The two constant current circuits 45 and 46, also known as current regulators or limiters or constant current source circuit, are designed to prevent the correction voltage $V_5$ from building up beyond a predefined limit. To this end the constant current circuits 45 and 46 keep the correction current $I_5$ (i.e., drain current of the nMOSFET $Q_5$) at not more than prescribed levels $I_3$ and $I_4$ which are set equal to each other. In practice the constant current circuits 45 and 46 may each take the form of an FET having its source and gate interconnected via a resistor, or of a transistor having its emitter and base interconnected via a resistor.

Figure 9:
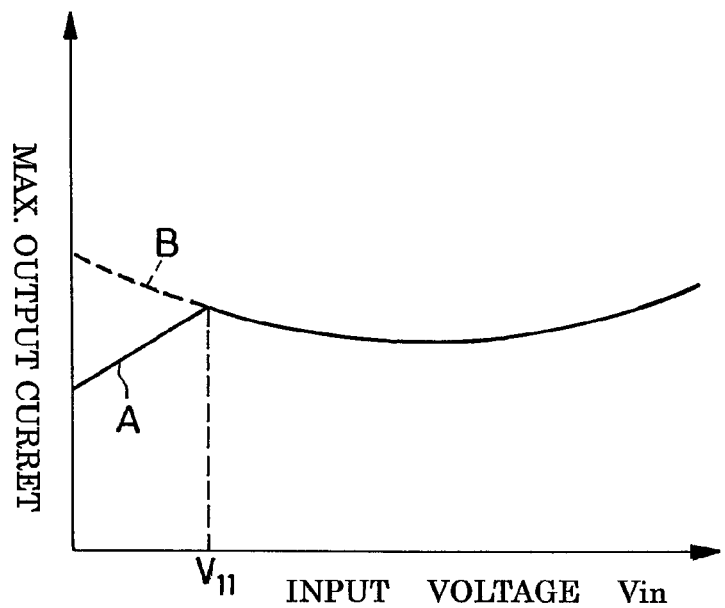
FIG. 9 is a graph plotting the curve of the maximum output current of the SMPS of FIGS. 4-6 against the input voltage.

In cases where the constant current circuits 45 and 46 are not required, the nMOSFETs $Q_4$ and $Q_5$ may have their sources connected to the ground terminal 44, either directly or via a resistor. The broken-line curve B in the graph of FIG. 9 represents the maximum output current against the input voltage $V_{in}$ when the nMOSFETs $Q_4$ and $Q_5$ are grounded directly via the terminal 44.

Reference may be had more specifically to FIGS. 7 and 8 for the following operational description of the SMPS shown in FIGS. 4-6. The current flowing through the primary winding $N_1$ of the transformer 2 increases with a gradient during each conducting period of the active switch 3, the transformer winding being an inductor. At (D) in both FIGS. 7 and 8 is given the current detect signal $V_3$ having a voltage proportional with the current flowing through the transformer primary $N_1$. The current detect signal $V_3$ is there drawn to include a component due to an oscillatory current immediately following the turning-on of the active switch 3. This current detect signal $V_3$ is to be delivered to the correcting circuit 42, FIG. 5, of the current detect signal correction network 40.

For a given output voltage $V_o$ of the SMPS, the active switch 3 will be longer in conducting period $T_{on}$ and higher in duty ratio, as at (D) in FIG. 7, when the input voltage $V_{in}$ is as low as, say, 120 volts. Conversely, when the input voltage $V_{in}$ is as high as, say, 370 volts, the active switch 3 will be shorter in conducting period $T_{on}$ and smaller in duty ratio as at (D) in FIG. 8.

Also delivered to the correcting circuit 42 of the current detect signal correction network 40 is the ramp voltage $V_2$, (B) in FIGS. 7 and 8, from the ramp generator 41. The ramp voltage $V_2$ is generated in synchronism with the clock pulses, (A) in FIGS. 7 and 8, from the clock 31 which are utilized to initiate conduction through the active switch 3. The ramp voltage $V_2$ is applied to the base of the transistor $Q_3$, FIG. 6, of the correcting circuit 42, thereby to be translated into the impedance of that transistor; that is, the impedance of the transistor $Q_3$ changes in inverse proportion with the ramp voltage $V_2$. As a consequence, there flows through the current-converting resistor $R_b$ of the correcting circuit 42 the current $I_1$ in proportion with the ramp voltage $V_2$.

This current $I_1$ is copied by the current mirror constituted of the pMOSFETs $Q_1$ and $Q_2$ into a current $I_2$ flowing through the drain of the pMOSFET $Q_2$. This copy current $I_2$ is itself copied by the other current mirror constituted of the nMOSFETs $Q_4$ and $Q_5$ into a current $I_5$ flowing through the drain of the nMOSFET $Q_5$.

As indicated at (C) in FIGS. 7 and 8, the current $I_5$ flows in proportion with the ramp voltage $V_2$ up to the limit $I_4$ ($=I_3$) imposed by the second constant current circuit 46. The current $I_5$ is shown so limited at (C) in FIG. 7 from $t_2$ to $t_4$ and at (C) in FIG. 8 from $t_2'$ to $t_4$. This current $I_5$ is herein termed the correction current. The correction current $I_5$ flows along the path sequentially comprising the first DC supply terminal $1_a$, FIG. 4, transformer primary $N_1$, active switch 3, LPF 26, FIG. 5, voltage-converting resistor $R_a$, FIG. 6, nMOSFET $Q_5$, second constant current circuit 46, and ground terminal 44. Thus the aforesaid correction voltage $V_5$ across the voltage-converting resistor $R_a$ is defined as $V_5=I_5 \times R_a$, where $R_a$ stands for the resistance of the resistor designated by the same indicia. The corrected current detect signal $V_4$ over the output conductor 47 of the correcting circuit 42 is defined as $V_4=V_3-V_5$.

At (D) in FIGS. 7 and 8 is shown the correction voltage $V_5$ as increasing with time during each conducting period of the active switch 3. The maximum value of the correction voltage $V_5$ is therefore less when the conducting periods of the active switch 3 are shorter because the input voltage $V_{in}$ is high, as in FIG. 8, than when the conducting periods are longer because the input voltage is low as in FIG. 7.

Referring to FIG. 9 again, the solid-line curve A in this graph represents the maximum value of the output current $I_o$ flowing into the load 21 against the input voltage $V_{in}$ as exhibited by the overcurrent-protected SMPS constructed as in FIGS. 4-6. It will be noted that the curve A far more closely approximates the ideal input-output relationship indicated by the solid line in FIG. 3.

As has been set forth in connection with FIG. 7, the conducting periods $T_{on}$ of the active switch 3 are longer when the input voltage $V_{in}$ is low than when it is high as in FIG. 8. The peak values of the correction voltage $V_5$ are therefore higher, so that the corrected current detect signal $V_4$ is less in peak value than the uncorrected current detect signal $V_3$. Possibly, in the event of an overcurrent when the load 2 is short-circuited or abnormally low in impedance, the corrected current detect signal $V_4$ may be much lowered by the correction voltage $V_5$ because the input voltage $V_{in}$ is low. Then the maximum output current will be kept from dropping because it will take longer for the corrected current detect signal $V_4$ to build up to the overcurrent threshold $V_r$. The corrected current detect signal $V_4$ is compared as aforesaid with the overcurrent threshold $V_r$ by the overcurrent detect comparator 35, FIG. 5, of the overcurrent protector 25.

FIGS. 7 and 8 are also explanatory of what happens when the load is short-circuited or low in impedance. As indicated by the dot-and-dash lines at (D) in these figures, the voltage $V_1$ delivered to the feedback comparator 28, FIG. 5, of the switch control signal generator 24 has a value $V_{1a}$ that is less than the overcurrent threshold $V_r$ under normal loading. However, when the load 2 is short-circuited or low in impedance, the voltage $V_1$ has a value $V_{1b}$ that is higher than the overcurrent threshold $V_r$. Consequently, under normal loading, the overcurrent detect comparator 35 does not put out turn-off trigger pulses earlier than the feedback comparator 28.

The conducting periods $T_{on}$ of the active switch 3 are shorter as in FIG. 8 when the input voltage $V_{in}$ is relatively high. The maximum value of the correction voltage $V_5$, or the maximum difference between uncorrected current detect signal $V_3$ and corrected current detect signal $V_4$, is therefore far less than in FIG. 7. As will be noted by referring back to FIG. 3, the maximum output current of the SMPS would grow higher with the input voltage $V_{in}$ if the current detect signal $V_3$ were not corrected despite changes in the input voltage. The decline of the correction voltage $V_5$ when the input voltage $V_{in}$ is high, as at (D) in FIG. 8, is favorable for approximating the ideal relationship between input voltage and maximum output current represented by the solid line in FIG. 3.

Let us assume that the correction current $I_5$ were not under the limitations of the constant current circuits 45 and 46, FIG. 6, of the correcting circuit 42. Then, as represented by the broken line B in the graph of FIG. 9, the maximum output current would inconveniently rise when the input voltage $V_{in}$ was lower than a relatively low value $V_{11}$. The drain current of the active switch 3 would have an excessively high peak value should the conducting periods of the active switch 3 grow inordinately long while the input voltage $V_{11}$ was low. The result in the worst case would be the saturation of the transformer 2.

Actually, in the illustrated embodiment, no such transformer saturation will take place as the maximum output current is kept as low as the broken line A in FIG. 9 when the input voltage $V_{in}$ is less than the value $V_{11}$. This advantageous effect results from the limitation of the correction voltage $V_5$ when the input voltage $V_{in}$ is less than the predetermined level, which in turn results from the limitation of the correction current $I_5$ by the constant current supplies 45 and 46.

The advantages gained by this embodiment of the invention, described hereinbelow with reference to FIGS. 4-9, may be recapitulated as follows:

1. The uncorrected current detect signal $V_3$ is converted into the corrected current detect signal $V_4$ through the simple expedient of subtracting the correction voltage $V_5$, which increases with time in each conducting period $T_{on}$ of the active switch 3, from the uncorrected current detect signal $V_3$.

2. The current detect signal correction network 40, containing all the means needed for correction of the current detect signal, is compactly built into the controller IC 7, contributing to the provision of a space-saving SMPS at a reduced manufacturing cost.

3. Unlike the prior art device of FIG. 1, no dedicated means is required for detection of the input voltage in order to correct the variations of the maximum output current with the input voltage. The invention thus overcomes the problems of power loss, rise in manufacturing cost, and large space requirement, all attendant upon the conventional input voltage detector circuit.

4. The invention does not require the rectangular wave generator of Japanese Unexamined Patent Publication No. 2005-184882 cited above for correction of the current detect signal and so is free from its accompanying drawbacks of power loss and space requirement. The SMPS according to the invention is therefore particularly efficient in light loading.

5. All that is needed for translating the uncorrected current detect signal $V_3$ into the corrected one $V_4$ is the resistor $R_a$ inserted in its path $26_a$, realizing a drastic reduction of both manufacturing cost and space requirement of the current detect signal correction network 40.

Figure 10:
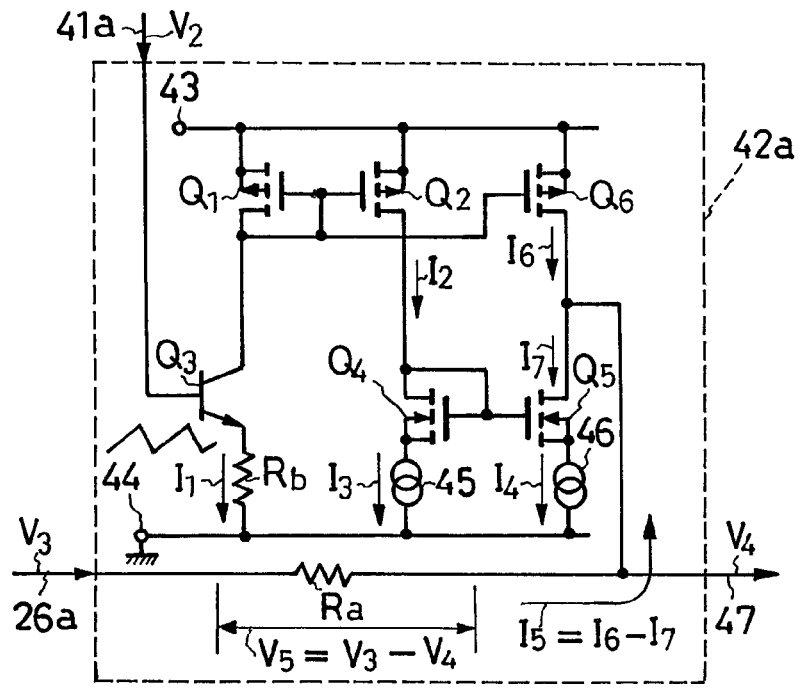
FIG. 10 is a schematic electrical diagram of a modified correcting circuit substitutable for the correcting circuit of FIG. 6.
Figure 11:
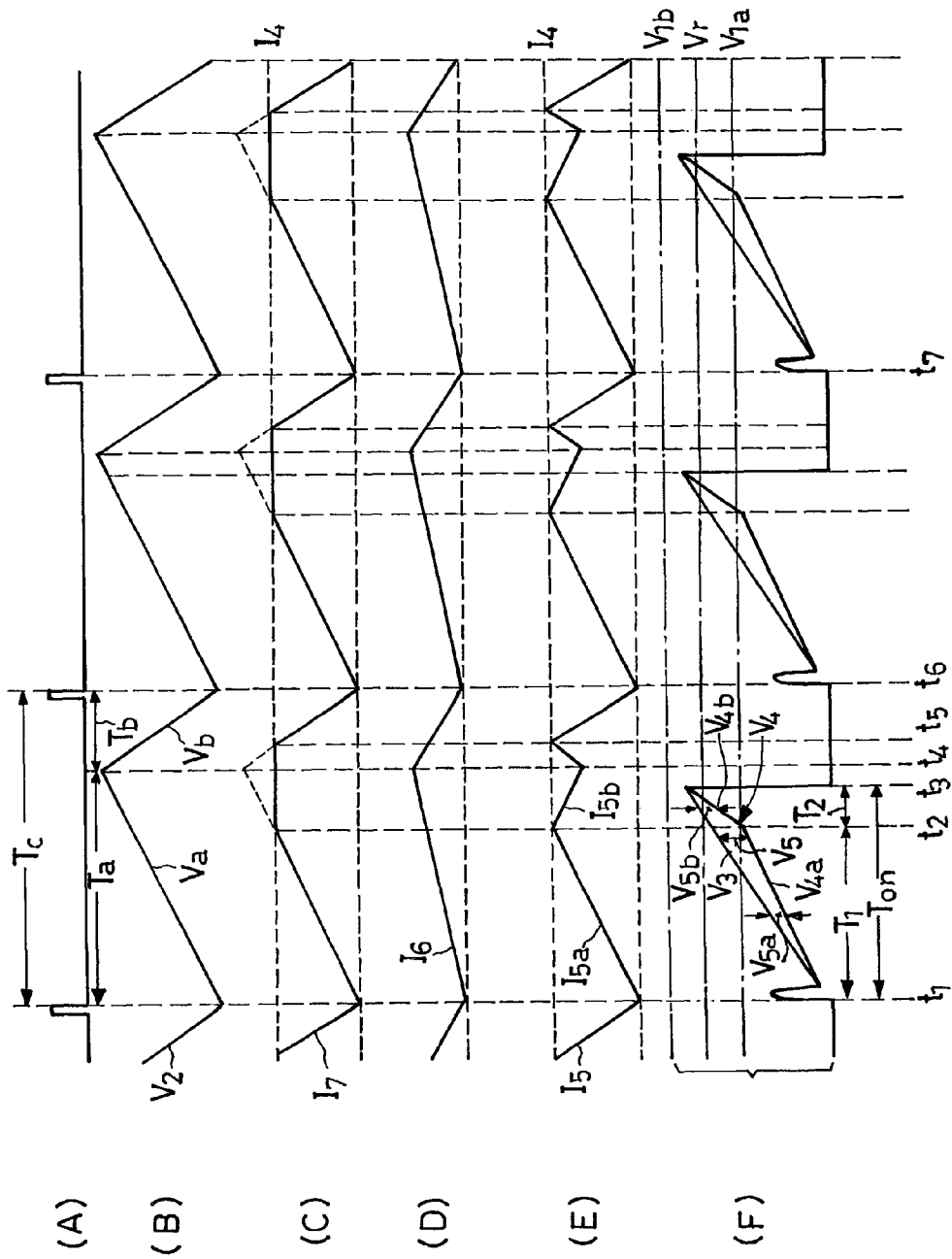
FIG. 11, consisting of (A) through (F), is a diagram of waveforms appearing at various parts of the SMPS incorporating the modified correcting circuit of FIG. 10.

Embodiment of FIGS. 10-11

The correcting circuit 42, shown in detail in FIG. 6, of the preceding embodiment is modifiable as diagramed in FIG. 10 and therein generally designated $42_a$. The modified correcting circuit $42_a$ finds use in the SMPS of FIGS. 4-6 in substitution for its FIG. 6 counterpart 42.

The modified correcting circuit $42_a$ comprises, in addition to all the parts and components appearing in FIG. 6, a sixth control device which takes the form of a p-channel MOSFET (pMOSFET) $Q_6$ in this embodiment. The pMOSFET $Q_6$ has its source connected to the DC supply terminal 43, its gate connected to the drain of the pMOSFET $Q_1$, and its drain connected to the drain of the nMOSFET $Q_5$. The modified correcting circuit $42_a$ is identical with its FIG. 6 counterpart 42 in all the other details of construction.

As will be understood by referring also to (F) in FIG. 11, the modified correcting circuit $42_a$ is designed to provide a correction voltage $V_5$ for restricting the variations of the maximum output current due to fluctuations in the input voltage $V_{in}$. The correction voltage $V_5$ of this embodiment goes up with time during the first division $T_1$, as from $t_1$ to $t_2$, of each conducting period $T_{on}$ of the active switch 3 and down with time during the second division $T_2$, as from $t_2$ to $t_3$, of each conducting period of the active switch. The correction voltage $V_5$ is utilized as in the foregoing embodiment for obtaining the corrected current detect signal $V_4$ by having itself subtracted from the uncorrected current detect signal $V_3$.

Referring more specifically to (F) in FIG. 11, each conducting period $T_{on}$ of the active switch 3 is herein shown divided as above into the two divisions $T_1$ and $T_2$ according to the duty ratio of the active switch. In this particular embodiment each conducting period $T_{on}$ of the active switch 3 is in the first division $T_1$ when the duty ratio is not more than 50 percent and in the second division $T_2$ when the duty ratio is more than 50 percent.

A subtraction of the noted growing correction voltage $V_5$ from the uncorrected current detect signal $V_3$ during the first division $T_1$ of the conducting period $T_{on}$ yields a relatively gently sloping first segment $V_{4a}$ of the corrected current detect signal $V_4$. A subtraction of the declining correction voltage $V_5$ from the uncorrected current detect signal $V_3$ during the second division $T_2$ of the conducting period $T_{on}$ provides a more steeply sloping second segment $V_{4b}$ of the corrected current detect signal $V_4$.

With reference back to FIG. 10, let $I_6$ be the drain current of the pMOSFET $Q_6$, and $I_7$ the drain current of the nMOSFET $Q_5$. Then the correction current $I_5$ flowing through the voltage-converting resistor $R_a$ is defined as $I_5=I_6-I_7$.

The SMPS incorporating the modified correcting circuit $42_a$ normally operates just like that of FIGS. 4-6. At (A) in FIG. 11 are shown the clock pulses from the clock 31, FIG. 5, of the switch control signal generator 24. The switch control signal generator 24 of the switch controller 7 initiates conduction through the active switch 3, FIG. 4, in response to these clock pulses and discontinues conduction therethrough in response to the off-trigger pulses from the feedback comparator 28.

FIG. 11, like FIG. 7, is explanatory of what takes place at various parts of the SMPS when the load becomes short-circuited or low in impedance while the input voltage $V_{in}$ is relatively high and the conducting periods $T_{on}$ relatively long. The clock pulses at (A), and ramp voltage $V_2$ at (B), in FIG. 11 are the same as those given at (A) and (B) in FIGS. 7 and 8. The current detect signal $V_3$ at (F) in FIG. 11 is essentially the same as that at (D) in FIG. 7. No repeated explanation of these signals is considered necessary. FIG. 11 differs from FIGS. 7 and 8 in that the former shows the drain current $I_7$ of the nMOSFET $Q_5$ at (C) and the drain current $I_6$ of the pMOSFET $Q_6$ at (D).

The modified correcting circuit $42_a$ inputs over the line $41_a$ the ramp voltage $V_2$, FIG. 11 (B), from the ramp generator 41, FIG. 5. By the action of the first current mirror constituted of $Q_1$, $Q_2$ and $Q_6$, the drain current $I_6$ of the pMOSFET $Q_6$ will flow as at (D) in FIG. 11 in proportion with the ramp voltage $V_2$. As the ramp voltage $V_2$ is an alternation of the positive-going segment $V_a$ and negative-going segment $V_b$, so is the drain current $I_6$ an alternation of a positive-going segment, as from $t_1$ to $t_4$, and a negative-going segment, as from $t_4$ to $t_6$. As indicated at (C) in FIG. 11, on the other hand, the drain current $I_7$ of the nMOSFET $Q_5$ will flow in proportion with the ramp voltage $V_2$ only from $t_1$ to $t_2$ and from $t_5$ to $t_6$, being fixed at the limit $I_4$ imposed by the second constant current supply 46 from $t_2$ to $t_5$.

There flows through the voltage-converting resistor $R_a$ of the modified correcting circuit $42_a$ the correction current $I_5$, FIG. 11 (E), which is equal to the drain current $I_6$ of the pMOSFET $Q_6$ minus the drain current $I_7$ of the nMOSFET $Q_5$. The correction current $I_5$ is a cyclic repetition of a positive-going segment $I_{5a}$, as from $t_1$ to $t_2$, a negative-going segment $I_{5b}$, as from $t_2$ to $t_4$, another positive-going segment, as from $t_4$ to $t_5$, and another negative-going segment, as from $t_5$ to $t_6$.

It will be observed from (E) and (F) in FIG. 11 that the correction voltage $V_5$ varies in proportion with the correction current $I_5$ during each conducting period $T_{on}$ of the active switch 3. As a result, during the first division $T_1$ of each conducting period $T_{on}$ of the active switch 3, the first segment $V_{5a}$ of the correction voltage $V_5$ increases with time, so that the first segment $V_{4a}$ of the corrected current detect signal $V_4$ rises relatively gently during this first division $T_1$ of each conducting period $T_{on}$. Possibly, the active switch 3 may be on for less than the first time division $T_1$. In that case the invention will be effective as in the first disclosed embodiment to reduce the variations of the maximum output current despite fluctuations in the input voltage $V_{in}$.

Then, during the second division $T_2$ of each conducting period $T_{on}$ of the active switch 3, there flows through the voltage-converting resistor $R_a$ the negative-going segment $I_{5b}$ of the correction current $I_5$, as at (E) in FIG. 11. Thus the correction voltage $V_5$ diminishes with time during this second time division $T_2$, as represented by the second segment $V_{5b}$ of the correction voltage at (F) in FIG. 11. The second segment $V_{4b}$ of the corrected current detect signal $V_4$ goes up more steeply during the second time division $T_2$ than does the first segment $V_{4a}$ thereof during the first time division $T_1$. This steep buildup of the corrected current detect signal $V_4$ in its second segment $V_{4b}$ is just as effective for prevention of subharmonic oscillation as the conventional slope-corrected current detect signal referred to earlier herein.

Admittedly, the slope correction for prevention of subharmonic oscillation will not occur when the conducting periods $T_{on}$ of the active switch 3 are so short as to be less than 50 percent in duty ratio, that is, when the load becomes short-circuited or low in impedance in the first division $T_1$ of the conducting period $T_{on}$. Even then, however, this second embodiment will be just as effective as the first disclosed one for overcurrent protection with little or no dependence on variations in input voltage $V_{in}$. As will be noted from (F) in FIG. 11, the correction voltage $V_5$ will be a little less than its maximum value at $t_2$ if the corrected current detect signal $V_4$ crosses the overcurrent threshold $V_r$ shortly before $t_3$ when the corrected current detect signal $V_4$ peaks. The maximum output current will therefore be less input dependent than in the case where the current detect signal were not corrected.

This embodiment offers the benefit that the correcting circuit $42_a$ single-handedly serves the purposes of overcurrent protection with concurrent reduction of the dependency of the maximum output current on the input voltage and prevention of subharmonic oscillation. The dual-purpose correcting circuit $42_a$ is conducive to the provision of a more convenient, compact, and cost-saving overcurrent-protected SMPS.

Figure 12:
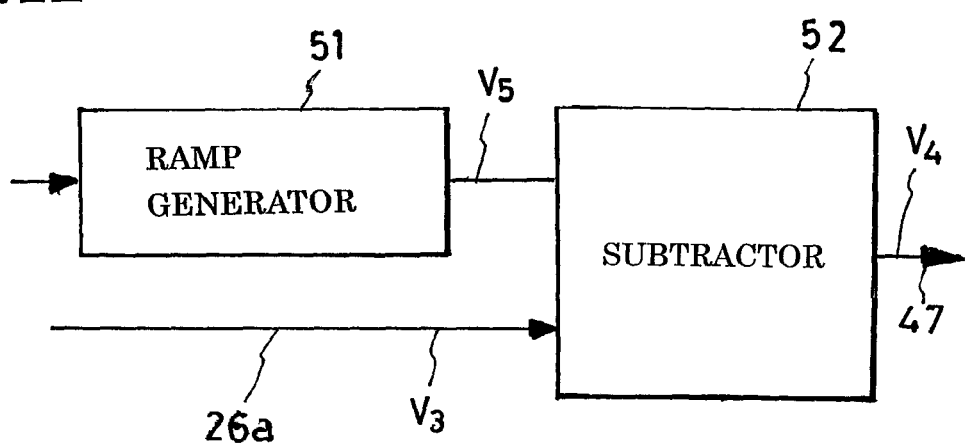
FIG. 12 is a block diagram of a modified current detect signal correction circuit.

Embodiment of FIG. 12

The current detect signal may be corrected as required by the invention by the alternative circuit arrangement of FIG. 12. At 51 in this figure is shown a ramp generator 51 which generates, rather than the ramp voltage $V_2$ of FIGS. 7 (B), the correction voltage $V_5$ of FIG. 7 (D) in synchronism with the clock pulses from the clock 31, FIG. 5. The correction voltage $V_5$ generated by the ramp generator 51 has its amplitude, which increases with time, so determined as to provide the desired performance characteristic of FIG. 9 or the ideal one of FIG. 3.

The correction voltage $V_5$ from the ramp generator 51 is delivered to a subtractor 52, to which is also supplied the uncorrected, low-pass-filtered current detect signal $V_3$ over the conductor $26_a$ similar to that of FIG. 5. The subtractor 52 subtracts the correction voltage $V_5$ from the uncorrected current detect signal $V_3$ and puts out the corrected current detect signal $V_4$ on the line 47 for delivery to the overcurrent detect comparator 35, FIG. 5, and feedback comparator 28.

In principle the correction means of FIG. 12 are the same as the current detect signal correction network 40 of FIGS. 5 and 6, so that this embodiment gains the same advantages as does that of FIGS. 4-6.

Figure 13:
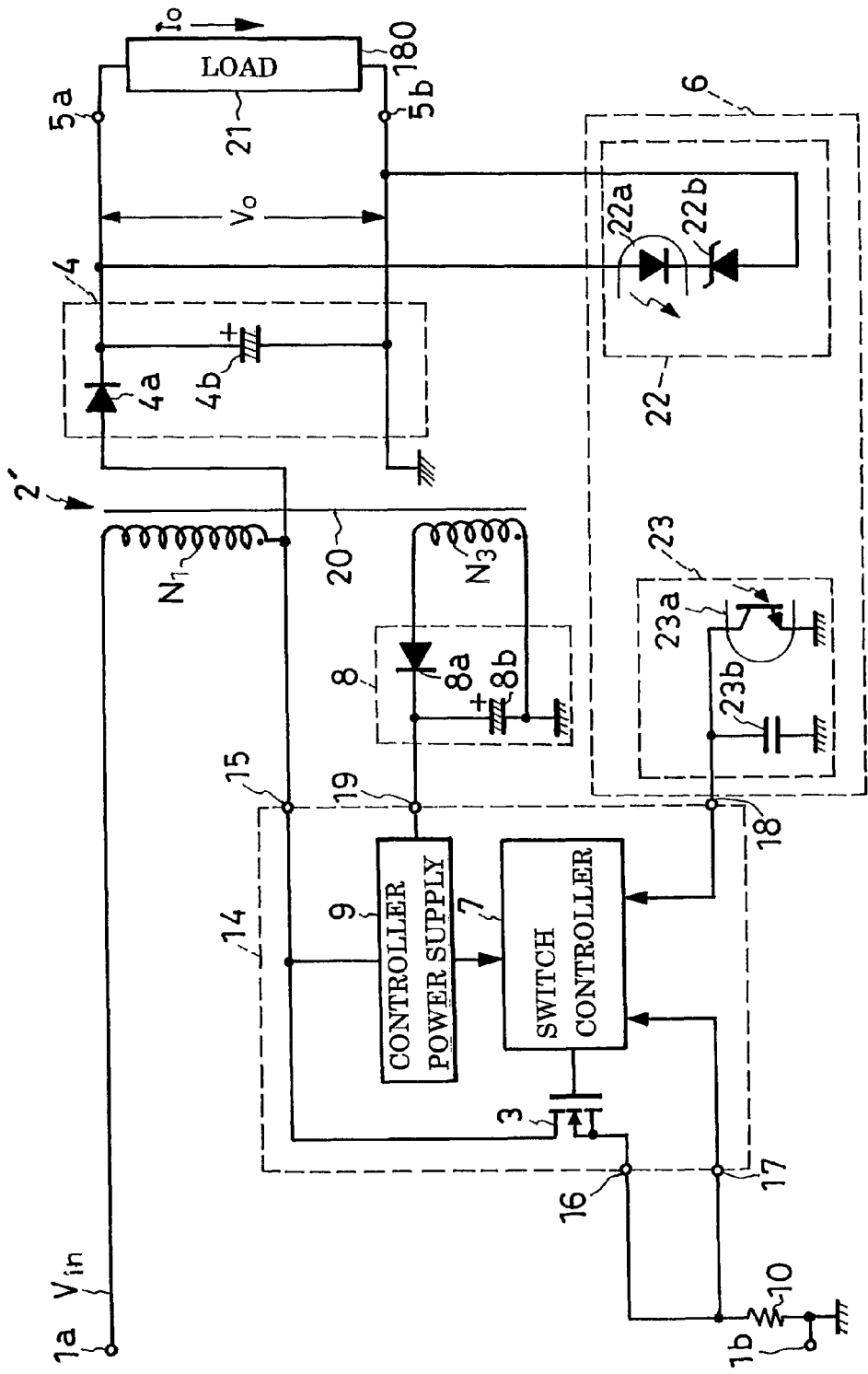
FIG. 13 is a diagram similar to FIG. 4 but showing a further preferred form of overcurrent-protected SMPS according to the invention.

Embodiment of FIG. 13

The secondary winding $N_2$ of the transformer 2 shown in FIG. 4 is not a requirement if the SMPS is reconfigured as in FIG. 13. The transformer 2' shown here is equivalent to that of FIG. 4 minus the secondary winding $N_2$. The output rectifying and smoothing circuit 4 of this embodiment, itself akin to that of FIG. 4, has its smoothing capacitor $4_b$ connected in parallel with the serial connection of the active switch 3 and current detect resistor 10 via the diode $4_a$. Alternatively, the output rectifying and smoothing circuit 4 could be connected in parallel with only the active switch 3.

Essentially, the SMPS of FIG. 13 is a DC-to-DC step-up converter. The energy stored in the transformer primary $N_1$ as the inductive winding during each conducting period of the active switch 3 is released to the output side of the transformer during the nonconducting period of the switch.

Since all the other details of construction of this embodiment are similar to those of the FIGS. 4-6 embodiment, it is evident that the former possesses all the listed advantages of the latter. It will also be apparent that the switch controller 7 of this embodiment could incorporate the modified correcting circuit $42_a$, FIG. 10, instead of the first disclosed one 42, FIG. 6.

Possible Modifications

Although the switching-mode power supply according to the present invention has been shown and described hereinbefore in terms of some currently preferred forms, it is not desired that the invention be limited by the exact details of these preferred forms or by the description thereof. The following is a brief list of possible modifications of the illustrated embodiments which are all believed to fall within the purview of the instant invention:

1. The current detect resistor 10, FIG. 4, is replaceable by other functionally equivalent means such as a magneto-electric converter.

2. Both active switch 3, FIG. 4, and control devices $Q_1$-$Q_6$, FIGS. 6 and 10, could take the form of various controllable semiconductor devices other than those exemplified. For example, $Q_1$, $Q_2$ and $Q_6$ could be pnp transistors, $Q_4$ and $Q_5$ could be npn transistors, and $Q_3$ could be an nMOSFET.

3. An alternative construction is possible for the switch control signal generator 24, FIG. 5: for example, the plus input of the feedback comparator 28 could be connected to the LPF 26 or to the current detect resistor 10 rather than to the current detect signal correction network 40.

4. The output of the overcurrent detect comparator 35, FIG. 5, of the overcurrent protector 25 could be connected not to the OR gate 29 but to some other part capable of terminating conduction through the active switch 3. It is possible to utilize the output from the overcurrent detect comparator 35 for interrupting the delivery of the width-modulated switch control pulses from the flip-flop 30.

5. In those applications of the invention where the maximum output current may vary like the broken line curve B, FIG. 9, with the input voltage, the sources of the control devices $Q_4$ and $Q_5$, FIG. 6, of the correcting circuit 42 may be grounded either directly or via resistors, rather than via the constant current supplies 45 and 46.

6. An alternative construction is possible for the output voltage detector circuit 6, FIG. 4: for example, the output voltage $V_o$ and a reference voltage may both be input to a differential amplifier, and its output connected to the LED $22_a$. The output of this differential amplifier may be electrically coupled to the feedback comparator 28, FIG. 5, in cases where the primary and secondary sides of the transformer 2 need not be electrically isolated from each other.

7. The ramp generator 41, FIG. 5, or 51, FIG. 12, need not be clocked from the clock 31 but from the flip-flop 30, it being only required that the ramp generator be synchronized with the beginnings of the conducting periods of the active switch 3.

8. The output rectifying and smoothing circuit 4 of FIG. 4 is omissible.

What is claimed is:

1. An overcurrent-protected, switching-mode power supply for DC-to-DC conversion, comprising:
    (a) DC input means for inputting a DC voltage;
    (b) DC output means for outputting a DC voltage;
    (c) inductance means connected to the DC input means;
    (d) an active switch connected to the DC input means via the inductance means for switching the DC input voltage on and off;
    (e) a rectifying and smoothing circuit connected between the inductance means and the DC output means for providing the DC output voltage for application to the DC output means;
    (f) an output voltage detector circuit connected to the rectifying and smoothing circuit for detecting the DC output voltage;
    (g) switch control signal generator means connected between the output voltage detector circuit and the active switch for turning the latter on and off to keep the DC output voltage constant;
    (h) current detect means for providing an uncorrected current detect signal indicative of a current flowing through the active switch;
    (i) current detect signal correction means connected to the switch control signal generator means and the current detect means for providing a corrected current detect signal by generating a correction signal which grows with time during each conducting period of the active switch and by subtracting the correction signal from the uncorrected current detect signal;
    (j) an overcurrent threshold source for providing a signal indicative of an overcurrent threshold of the current flowing through the active switch; and
    (k) a comparator having a first input connected to the current detect signal correction means, a second input connected to the overcurrent threshold source, and an output connected to the switch control signal generator means, for causing the switch control signal generator means to turn off the active switch when the corrected current detect signal rises to the overcurrent threshold.

2. The overcurrent-protected, switching-mode power supply of claim 1 wherein the current detect signal correction means comprises:

(a) a ramp generator for generating a ramp voltage in synchronism with conducting periods of the active switch, the ramp voltage repeating a ramp that is longer than a maximum possible conducting period of the active switch;
(b) a correcting circuit connected to the current detect means and the ramp generator for providing the corrected current detect signal by generating the correction signal which varies with each ramp of the ramp voltage and by subtracting the correction signal from the current detect signal.

3. The overcurrent-protected, switching-mode power supply of claim 2 wherein the correcting circuit of the current detect signal correction means further comprises means for holding the correction signal at less than a predetermined limit.

4. The overcurrent-protected, switching-mode power supply of claim 2 wherein the correcting circuit of the current detect signal correction means comprises:
(a) a DC supply terminal;
(b) a ground terminal;
(c) a voltage-converting resistor connected between the current detect means and the first input of the comparator;
(d) a current-converting resistor;
(e) a first control device having a first main electrode connected to the DC supply terminal, a second main electrode, and a control electrode connected to the second main electrode of the first control device;
(f) a second control device having a first main electrode connected to the DC supply terminal, a second main electrode, and a control electrode connected to the control electrode and second main electrode of the first control device;
(g) a third control device having a first main electrode connected to the ground terminal via the current-converting resistor, a second main electrode connected to the second main electrode of the first control device, and a control electrode connected to the ramp generator of the current detect signal correction means;
(h) a fourth control device having a first main electrode connected to the ground terminal, a second main electrode connected to the second main electrode of the second control device, and a control electrode; and
(i) a fifth control device having a first main electrode connected to the ground terminal, a second main electrode connected to the voltage-converting resistor, and a control electrode connected to the control electrode and second main electrode of the fourth control device.

5. The overcurrent-protected, switching-mode power supply of claim 4 wherein the correcting circuit of the current detect signal correction means further comprises:
(a) a first constant current circuit connected between the first main electrode of the fourth control device and the ground terminal for limiting a current flowing through the fourth control device; and
(b) a second constant current circuit connected between the first main electrode of the fifth control device and the ground terminal for limiting a current flowing through the fifth control device.

6. The overcurrent-protected, switching-mode power supply of claim 1 wherein the inductance means comprises a primary winding and a secondary winding electromagnetically coupled to each other, wherein the active switch is connected to the DC input means via the primary winding, and wherein the rectifying and smoothing circuit is connected between the secondary winding and the DC output means.

7. The overcurrent-protected, switching-mode power supply of claim 1 wherein the inductance means comprises an inductive winding, wherein the active switch is connected to the DC input means via the inductive winding, and wherein the rectifying and smoothing circuit is connected in parallel with the active switch.

8. An overcurrent-protected, switching-mode power supply for DC-to-DC conversion, comprising:
(a) DC input means for inputting a DC voltage;
(b) DC output means for outputting a DC voltage;
(c) inductance means connected to the DC input means;
(d) an active switch connected to the DC input means via the inductance means for switching the DC input voltage on and off;
(e) a rectifying and smoothing circuit connected between the inductance means and the DC output means for providing the DC output voltage for application to the DC output means;
(f) an output voltage detector circuit connected to the rectifying and smoothing circuit for detecting the DC output voltage;
(g) switch control signal generator means connected between the output voltage detector circuit and the active switch for turning the latter on and off to keep the DC output voltage constant;
(h) current detect means for providing an uncorrected current detect signal indicative of a current flowing through the active switch;
(i) current detect signal correction means connected to the switch control signal generator means and the current detect means for providing a corrected current detect signal by generating a correction signal which goes up with time during a first predefined segment of each conducting period of the active switch and which goes down with time during a second predefined segment of each conducting period of the active switch and by subtracting the correction signal from the uncorrected current detect signal;
(j) an overcurrent threshold source for providing a signal indicative of an overcurrent threshold of the current flowing through the active switch; and
(k) a comparator having a first input connected to the current detect signal correction means, a second input connected to the overcurrent threshold source, and an output connected to the switch control signal generator means, for causing the switch control signal generator means to turn off the active switch when the corrected current detect signal rises to the overcurrent threshold.

9. The overcurrent-protected, switching-mode power supply of claim 8 wherein the current detect signal correction means comprises:
(a) a ramp generator for generating a ramp voltage in synchronism with conducting periods of the active switch, the ramp voltage repeating a ramp that is longer than a maximum possible conducting period of the active switch;
(b) a correcting circuit connected to the current detect means and the ramp generator for providing the corrected current detect signal by generating the correction signal which goes up with time during a first predefined segment of each conducting period of the active switch and which goes down with time during a second predefined segment of each conducting period of the active switch and by subtracting the correction signal from the uncorrected current detect signal.

10. The overcurrent-protected, switching-mode power supply of claim 9 wherein the correcting circuit of the current detect signal correction means comprises:

(a) a DC supply terminal;
(b) a ground terminal;
(c) a voltage-converting resistor connected between the current detect means and the first input of the comparator;
(d) a current-converting resistor;
(e) a first and a second constant current circuit;
(f) a first control device having a first main electrode connected to the DC supply terminal, a second main electrode, and a control electrode connected to the second main electrode of the first control device;
(g) a second control device having a first main electrode connected to the DC supply terminal, a second main electrode, and a control electrode connected to the control electrode and second main electrode of the first control device;
(h) a third control device having a first main electrode connected to the ground terminal via the current-converting resistor, a second main electrode connected to the second main electrode of the first control device, and a control electrode connected to the ramp generator of the current detect signal correction means;
(i) a fourth control device having a first main electrode connected to the ground terminal via the first constant current circuit, a second main electrode connected to the second main electrode of the second control device, and a control electrode;
(j) a fifth control device having a first main electrode connected to the ground terminal via the second constant current circuit, a second main electrode, and a control electrode connected to the control electrode and second main electrode of the fourth control device; and
(k) a sixth control device having a first main electrode connected to the DC supply terminal, a second main electrode connected to the second main electrode of the fifth control device and to the voltage-converting resistor, and a control electrode connected to the control electrodes of the first and the second control device and to the second main electrode of the first control device;
(l) the first constant current circuit limiting a current flowing through the fourth control device;
(m) the second constant current circuit limiting a current flowing through the fifth control device.

11. The overcurrent-protected, switching-mode power supply of claim 8 wherein the inductance means comprises a primary winding and a secondary winding electromagnetically coupled to each other, wherein the active switch is connected to the DC input means via the primary winding, and wherein the rectifying and smoothing circuit is connected between the secondary winding and the DC output means.

12. The overcurrent-protected, switching-mode power supply of claim 8 wherein the inductance means comprises an inductive winding, wherein the active switch is connected to the DC input means via the inductive winding, and wherein the rectifying and smoothing circuit is connected in parallel with the active switch.

13. An overcurrent-protected, switching-mode power supply, comprising:

(a) DC input means for inputting a DC voltage;
(b) inductance means connected to the DC input means;
(c) an active switch connected to the DC input means via the inductance means for switching the DC input voltage on and off;
(d) output means connected to inductance means for outputting a voltage;
(e) an output voltage detector circuit connected to the output means for detecting the output voltage;
(f) switch control signal generator means connected between the output voltage detector circuit and the active switch for turning the latter on and off to keep the output voltage constant;
(g) current detect means for providing an uncorrected current detect signal indicative of a current flowing through the active switch;
(h) current detect signal correction means connected to the switch control signal generator means and the current detect means for providing a corrected current detect signal by generating a correction signal which grows with time during each conducting period of the active switch and by subtracting the correction signal from the uncorrected current detect signal;
(j) an overcurrent threshold source for providing a signal indicative of an overcurrent threshold of the current flowing through the active switch; and
(k) a comparator having a first input connected to the current detect signal correction means, a second input connected to the overcurrent threshold source, and an output connected to the switch control signal generator means, for causing the switch control signal generator means to turn off the active switch when the corrected current detect signal rises to the overcurrent threshold.

14. An overcurrent-protected, switching-mode power supply comprising:

(a) DC input means for inputting a DC voltage;
(b) inductance means connected to the DC input means;
(c) an active switch connected to the DC input means via the inductance means for switching the DC input voltage on and off;
(d) output means connected to inductance means for outputting a voltage;
(e) an output voltage detector circuit connected to the output means for detecting the output voltage;
(f) switch control signal generator means connected between the output voltage detector circuit and the active switch for turning the latter on and off to keep the output voltage constant;
(g) current detect means for providing an uncorrected current detect signal indicative of a current flowing through the active switch;
(h) current detect signal correction means connected to the switch control signal generator means and the current detect means for providing a corrected current detect signal by generating a correction signal which goes up with time during a first predefined segment of each conducting period of the active switch and which goes down with time during a second predefined segment of each conducting period of the active switch and by subtracting the correction signal from the uncorrected current detect signal;
(i) an overcurrent threshold source for providing a signal indicative of an overcurrent threshold of the current flowing through the active switch; and
(j) a comparator having a first input connected to the current detect signal correction means, a second input connected to the overcurrent threshold source, and an output connected to the switch control signal generator means, for causing the switch control signal generator means to turn off the active switch when the corrected current detect signal rises to the overcurrent threshold.

* * * * *